(12) United States Patent
Li

(10) Patent No.: US 7,233,567 B1
(45) Date of Patent: Jun. 19, 2007

(54) APPARATUS AND METHOD FOR SUPPORTING MULTIPLE TRAFFIC REDUNDANCY MECHANISMS

(75) Inventor: Yunzhou Li, Lowell, MA (US)

(73) Assignee: Nortel Networks Limited (CA)

( * ) Notice: Subject to any disclaimer, the term of this patent is extended or adjusted under 35 U.S.C. 154(b) by 900 days.

(21) Appl. No.: 09/668,220

(22) Filed: Sep. 22, 2000

(51) Int. Cl.
*H04L 1/22* (2006.01)
(52) U.S. Cl. .................................... 370/217
(58) Field of Classification Search ........ 370/217–218, 370/225–228, 242–245, 248, 389, 463, 419–421; 709/238
See application file for complete search history.

(56) References Cited

U.S. PATENT DOCUMENTS

| | | | |
|---|---|---|---|
| 5,596,569 A * | 1/1997 | Madonna et al. ........... 370/217 |
| 5,835,696 A * | 11/1998 | Hess ........................... 714/10 |
| 6,381,218 B1 * | 4/2002 | McIntyre et al. ........... 370/245 |
| 6,388,995 B1 * | 5/2002 | Gai et al. .................... 370/256 |
| 6,532,088 B1 * | 3/2003 | Dantu et al. .................. 398/43 |
| 6,717,913 B1 * | 4/2004 | Ghahremani et al. ....... 370/230 |
| 2002/0004843 A1 * | 1/2002 | Andersson et al. ......... 709/238 |

* cited by examiner

*Primary Examiner*—Doris H. To
*Assistant Examiner*—Thai Hoang
(74) *Attorney, Agent, or Firm*—McGuinness & Manaras LLP

(57) ABSTRACT

An apparatus and method for managing multiple traffic redundancy mechanisms includes a resource manager for managing the multiple redundancy mechanisms for bridging traffic between a working port and a protection port, and uses an agent for the working port in order to maintain routes associated with the working port even after a failure occurs that affects communication over the working port. The resource manager creates a protection group including the working port and the protection port. A traffic bridge is established between the working port and the protection port.

44 Claims, 10 Drawing Sheets

APPARATUS AND METHOD FOR SUPPORTING MULTIPLE TRAFFIC REDUNDANCY MECHANISMS

CROSS-REFERENCE TO RELATED APPLICATIONS

The present patent application may be related to the following commonly owned United States patent applications, which are hereby incorporated herein by reference in their entireties:

U.S. patent application Ser. No. 09/648,273 entitled A MECHANISM FOR AUTOMATIC PROTECTION SWITCHING IN A ROUTER, which was filed on Aug. 25, 2000 in the names of Dan Adamski, David Benson, Bilel Jamoussi, Yunzhou Li, and Jagannath Shantigram; and U.S. patent application Ser. No. 09/668,219 entitled SYSTEM, DEVICE, AND METHOD FOR BRIDGING NETWORK TRAFFIC, which was filed on even date herewith in the name of Yunzhou Li.

FIELD OF THE INVENTION

The present invention relates generally to communication systems, and more particularly to supporting multiple redundancy mechanisms in a networking device.

BACKGROUND OF THE INVENTION

In today's information age, computers and computer peripherals are frequently interconnected over a communication network. A typical communication net work includes a number of networking devices, such as switches and routers. These networking devices work together to route packets of information from a source device to one or more destination devices.

A typical networking device includes a central controller and a number of line cards. Each line card occupies a "slot" of the networking device, and supports one or more network interfaces (each referred to hereinafter as a "slot port") through which the networking device communicates with various other devices, including other networking devices. Exemplary slot port types include Ethernet and SONET.

Within the networking device, the line cards are interconnected by a switching fabric. Each line card includes one or more fabric interfaces (each referred to hereinafter as a "fabric port"). Among other things, the fabric ports on a particular line card may be used for supporting different types of fabric services (e.g., unicast versus multicast fabric ports) and/or for supporting priority queues (e.g., high priority versus low priority fabric ports). The switching fabric routes information between the line cards, and more particularly between fabric ports.

Each line card includes logic for receiving, processing, and transmitting packets. Each line card can receive and transmit packets over its fabric port(s) and over its slot port(s). Each line card maintains a routing table that is typically distributed to all line cards by the central controller. The routing table includes a number of routing table entries, where each routing table entry indicates, among other things, the outgoing associated with a particular destination. An outgoing interface can be a slot port on the same line card as indicated by a slot port number, a different line card as indicated by a slot number, or a specific fabric port on a different line card as indicated by a slot number/fabric port number pair.

The line cards interoperate over the switching fabric in order to route packets. Specifically, a packet received by a particular line card (referred to hereinafter as the "incoming line card") over a particular slot port may be forwarded to other slot ports on the same line card and/or to other line cards. The incoming line card uses its routing table to determine the outgoing interfaces for the packet, typically based upon a destination address or label in the packet, and forwards the packet over the outgoing interface(s).

In certain applications, two line cards are "bridged" so that all packets sent to a first line card (referred to hereinafter as a "working line card" or "WLC") over the switching fabric are also sent to a second line card (referred to hereinafter as the "protection line card" or "PLC"). Among other things, a bridge may be used for redundancy or protection switching. In a typical embodiment, bridging is accomplished by modifying the routing table to include the PLC as an outgoing interface in all routing table entries having the WLC as an outgoing interface. For convenience, each such routing table entry is referred to hereinafter as a "bridged routing table entry." With a bridge in place, any packet that is sent to the WLC is also sent to the PLC.

Data Path (DP) logic in the central controller typically maintains the IP/circuit (IP/CCT) handlers (HDLs) for each active slot port, and also maintains various processes for each active slot port. When a failure occurs that affects communication over a particular slot port (e.g., a link failure), the DP logic disables the slot port. Specifically, the DP logic tears down all routes that are associated with that slot port (i.e., all routes that include the slot port as an outgoing interface) and distributes an updated routing table to all line cards. The DP logic also removes any processes that are associated with the slot port.

When bridging is used, it is important for routes associated with the WLC to remain active even after a failure affecting communication over the WLC. This is because those routes are used to establish or maintain the bridge between the WLC and the PLC. Unfortunately, when the DP logic detects a failure affecting communication over the WLC, the DP logic tears down all routes associated with the WLC. This either destroys an existing bridge between the WLC and PLC or prevents a bridge from being established between the WLC and the PLC.

SUMMARY OF THE INVENTION

In accordance with one aspect of the invention, a resource manager is used for managing the multiple redundancy mechanisms for bridging traffic between a working port and a protection port, and an agent is used for the working port in order to maintain routes associated with the working port even after a failure occurs that affects communication over the working port. The resource manager creates a protection group including the working port and the protection port. A traffic bridge is established between the working port and the protection port.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

In an embodiment of the present invention, a protection resource manager (PRM) is used to manage bridges for redundancy and protection switching. The PRM is capable of handling multiple redundancy and protection switching mechanisms, such as SONET APS (Automatic Protection Switching) and Gigabit Ethernet (GbE) interface redundancy.

Each line card that requires protection is registered with the PRM as a WLC. Each line card that is available to provide protection is registered with the PRM as a PLC. The PRM maintains a number of protection groups, where each protection group includes at least one WLC that requires protection and at least one PLC that is available to provide protection. When a failure occurs that affects communication over a particular WLC, the PRM establishes a bridge between that WLC and a corresponding PLC in the same protection group using a predetermined redundancy or protection switching mechanism.

When a WLC registers with the PRM, the PRM creates an agent process for each slot port on the WLC. Each agent process maintains the IP/CCT handlers for its corresponding slot port in a Switch Control Driver (SCD), and interacts with the DP logic and the PRM on behalf of its corresponding slot port. An agent process remains active even after a failure affecting communication over its corresponding slot port. Because the agent process maintains the IP/CCT handlers and remains active even after the failure, the DP logic does not tear down routes associated with the WLC. Therefore, bridges can be established and maintained even after the failure occurs.

Figure 1:
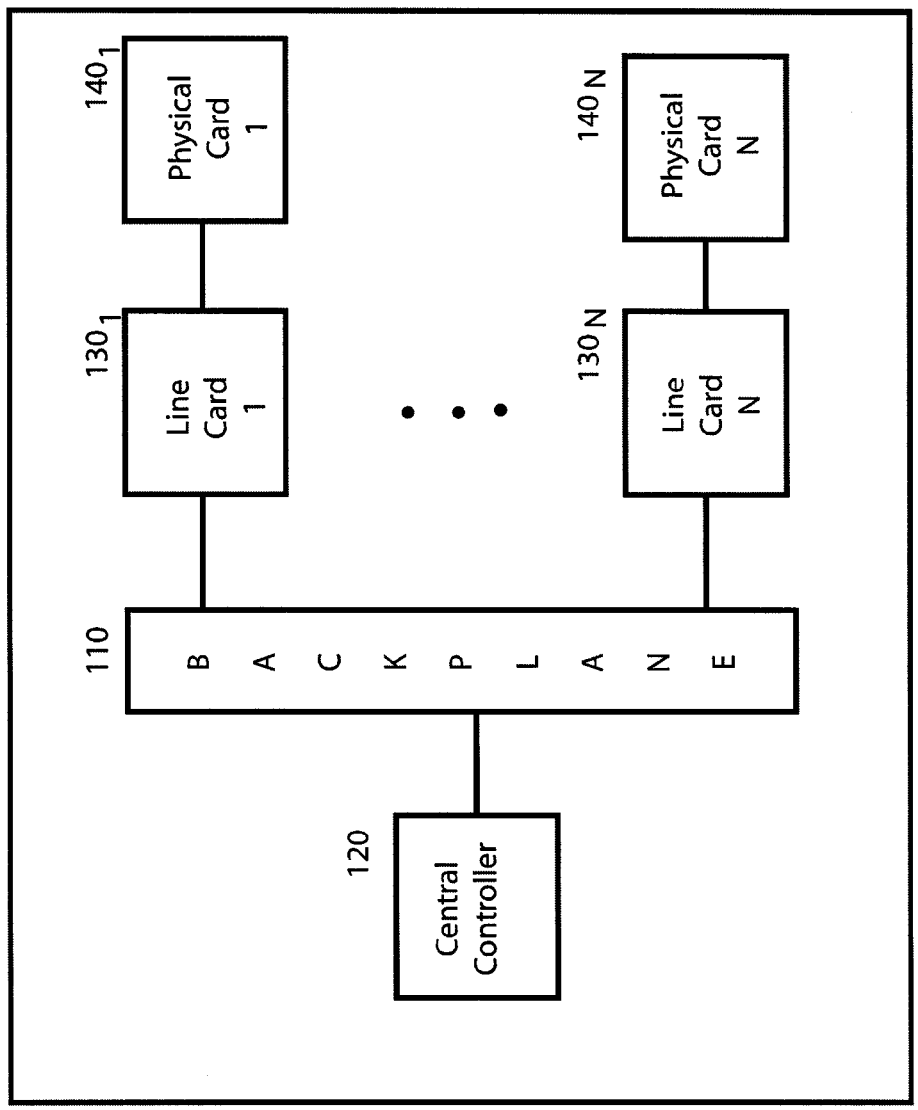
FIG. 1 is a block diagram showing the relevant components of an exemplary networking device in accordance with an embodiment of the present invention.

FIG. 1 shows the relevant components of an exemplary networking device 100. Among other things, the networking device 100 includes at least one central controller 120, a number of line cards $130_1$-$130_N$, and a number of physical cards $140_1$-$140_N$. The central controller 120 provides management and control for the networking device 100 as a whole. A typical embodiment of the networking device 100 includes two redundant central controllers. The central controller 120 and the line cards $130_1$-$130_N$ are interconnected via a backplane 110. The backplane 110 includes, among other things, a switching fabric for high-speed communication between the line cards $130_1$-$130_N$, a fast bus for downloading routing tables from the central controller 120 to the line cards $130_1$-$130_N$, and a slow bus for management of the line cards $130_1$-$130_N$ by the central controller 120. The line cards $130_1$-$130_N$ are inserted into physical slots of the networking device 100. Each physical slot is associated with a slot of the switching fabric (referred to hereinafter as a "fabric slot"). Thus, each line card $130_1$-$130_N$ is coupled to a corresponding fabric slot.

Each line card $130_1$-$130_N$ is coupled to a respective physical card $140_1$-$140_N$. For convenience, the combination of a line card 130 and a physical card 140 is sometimes referred to as a "circuit pack group." The line cards $130_1$-$130_N$ provide various networking services for communicating with various external devices. Exemplary line card types include Internet Protocol (IP) and Asynchronous Transfer Mode (ATM). The physical cards $140_1$-$140_N$N provide physical interfaces for communicating with various external devices. Exemplary physical card types include Ethernet and SONET. Exemplary circuit pack groups include ATM-over-SONET and IP-over-SONET.

Figure 2:
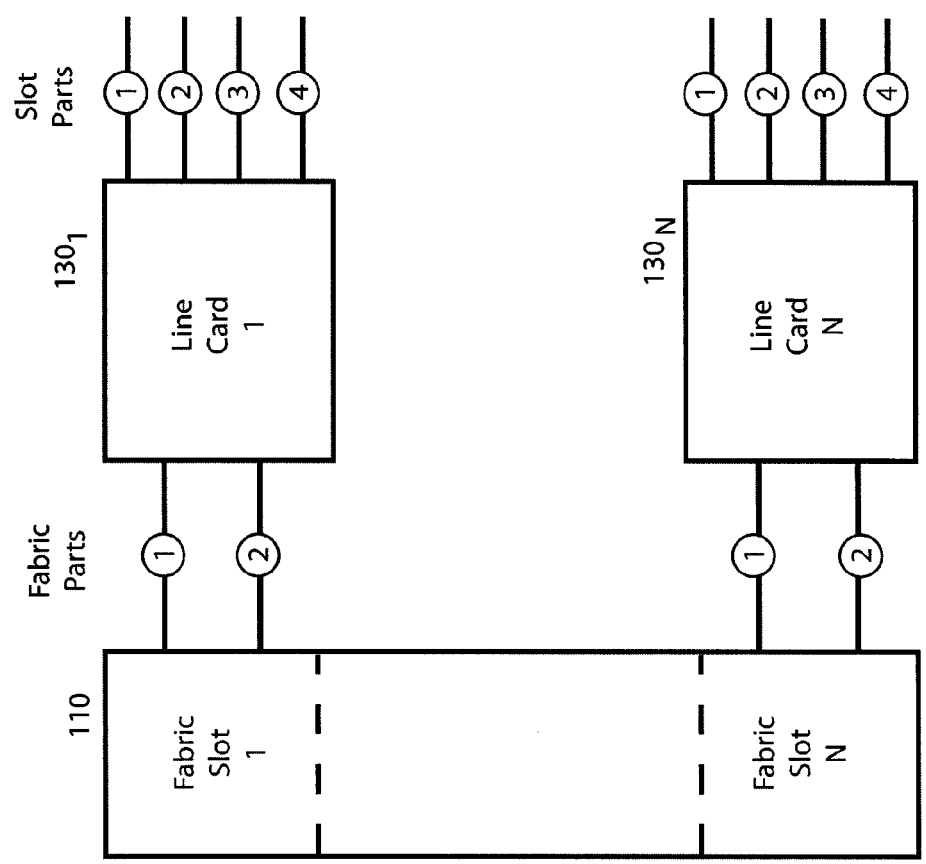
FIG. 2 is a block diagram that demonstrates the relationship between the line cards and the switching fabric of an exemplary networking device in accordance with an embodiment of the present invention.

FIG. 2 shows the line cards $130_1$-$130_N$ coupled to the switching fabric of the backplane 110. Each line card $130_1$-$130_N$ is associated with a corresponding fabric slot, and interfaces with the switching fabric through a number of fabric ports. Each line card $130_1$-$130_N$ also includes a number of slot ports. In the example shown in FIG. 2, each line card $130_1$-$130_N$ is coupled to its corresponding fabric slot via two fabric ports (fabric port 1 and fabric port 2), and each line card $130_1$-$130_N$ includes four slot ports (slot port 1, slot port 2, slot port 3, and slot port 4. It should be noted that each line card $130_1$-$130_N$ may be coupled to the switching fabric via one or more fabric ports, and may have one or more slot ports.

Within the networking device 100, the switching fabric routes information between the various line cards. Specifically, the switching fabric is capable of routing a packet from an incoming line card to one or more destination line cards based upon a header that is added to the packet by the incoming line card. The header identifies one or more destination slots for the packet. The header may also indicate the destination fabric port for each destination slot and the destination slot port(s) for each destination slot.

Each line card $130_1$-$130_N$ includes logic for receiving, processing, and transmitting packets. Each line card can receive and transmit packets over its fabric port(s) and over its slot port(s). Each line card maintains a routing table that is typically distributed to the line cards $130_1$-$130_N$ by the central controller 120. The routing table includes a number of routing table entries, where each routing table entry indicates, among other things, the outgoing interface(s) associated with a particular destination. An outgoing interface can be a slot port on the same line card as indicated by a slot port number, a different line card as indicated by a slot number, or a specific fabric port on a different line card as indicated by a slot number/fabric port number pair.

Figure 3:
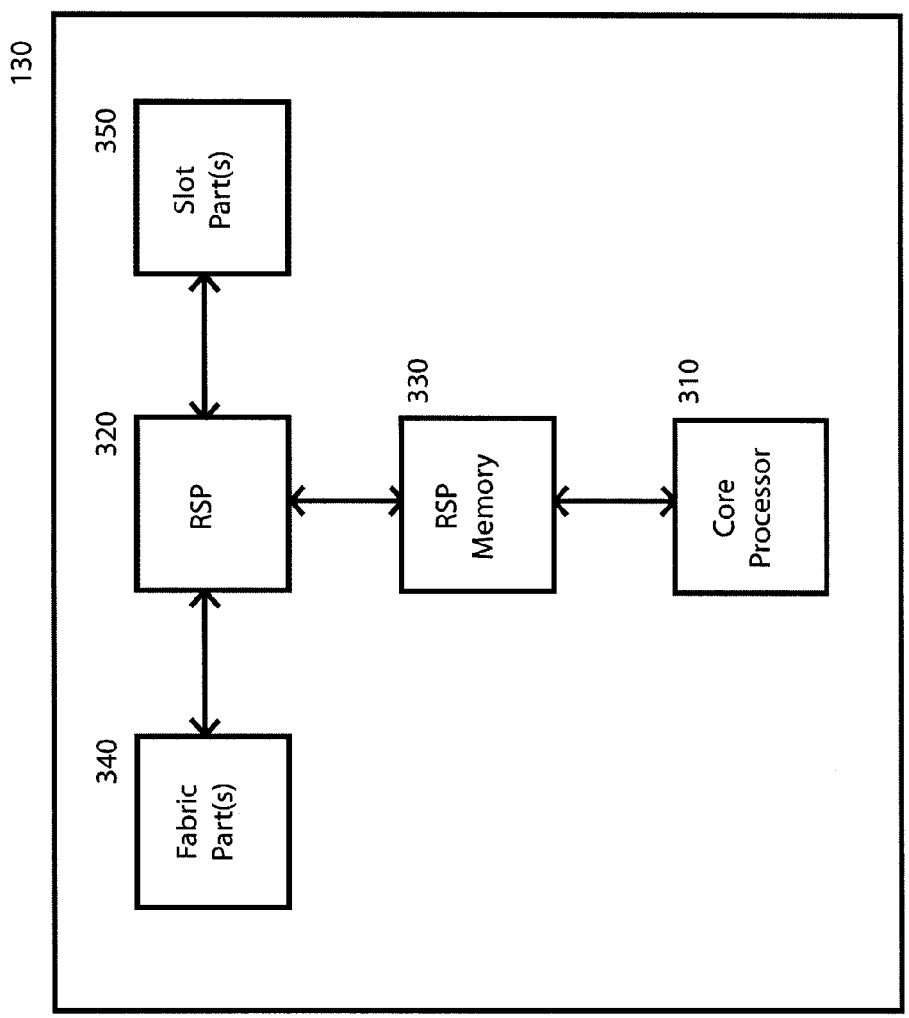
FIG. 3 is a block diagram showing the relevant components of an exemplary line card in accordance with an embodiment of the present invention.

FIG. 3 shows the relevant components of an exemplary line card 130. Among other things, the line card 130 includes a core processor 310, at least one routing switch processor (RSP) 320 for processing packets, an RSP memory 330 for storing the routing table, fabric port(s) 340, and slot port(s) 350. The RSP 320 is an Application Specific Integrated Circuit (ASIC) that is essentially a fast-forwarding engine including, among other things, inbound filtering logic, outbound filtering logic, policy filtering logic, Committed Information Rate (CIR) logic, and Type of Service (TOS) logic. The RSP memory 330 is used to store the routing table. The core processor 310 provides management and control for the line card 130, and includes logic for receiving the routing table from the central controller 120 over the fast bus, storing the routing table in the RSP memory 330, and configuring the RSP 320 based upon predetermined configuration information. It should be noted that FIG. 3 does not show all components of the line card 130, nor does it show all connections between components.

When a packet is received from a slot port 350, the RSP 320 uses the routing table in the RSP memory 330 to determine the outgoing interface(s) for the packet. Assuming that the packet needs to be forwarded to at least one other line card, the RSP 320 creates a header for the packet indicating at least the destination slot(s) for the packet, adds the header to the packet, and forwards the packet to the switching fabric over a fabric port 340.

Figure 4:
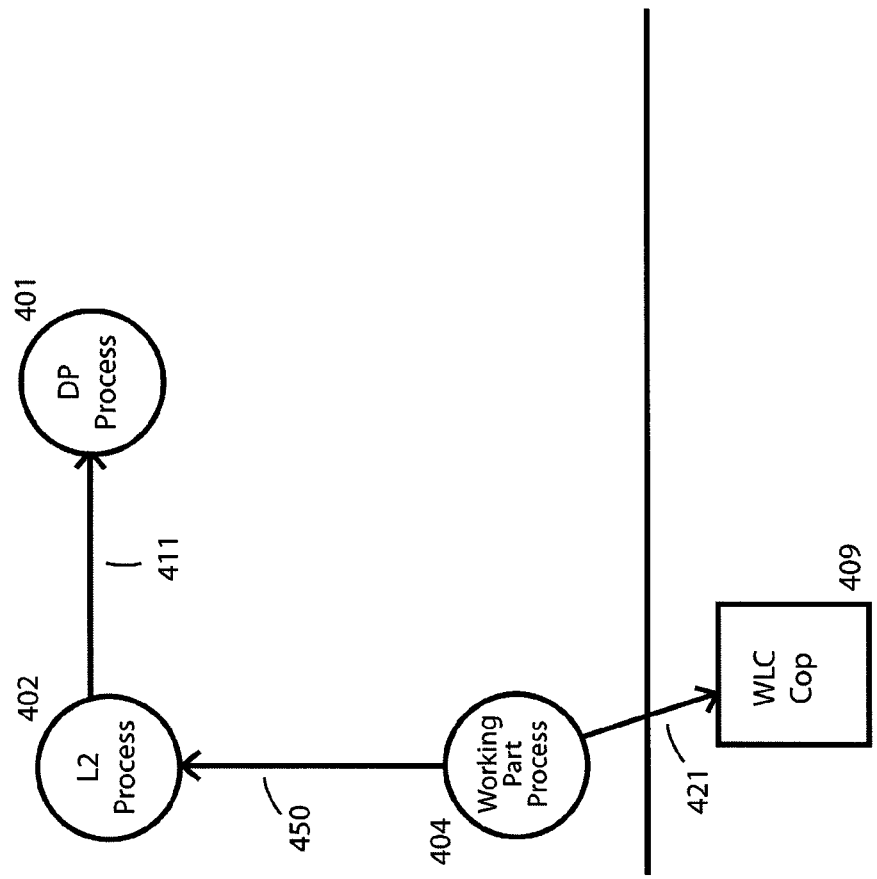
FIG. 4 is a schematic diagram showing the relevant processes associated with an exemplary embodiment of the present invention in which no protection is used.

FIG. 4 shows the relevant processes when no protection is used. The relevant processes include a DP process 401, a layer 2 (L2) process 402, a working port process 404, and a WLC core process (CoP) 409. When a slot port on the WLC is activated, the DP logic creates the working port process 404 for the slot port. The working port process activates the WLC CoP 409, and also sends its descriptors and data path line record to the L2 process 402 using a predetermined "dp line" function, as shown by the arrow 450. The L2 process 402 in turn sends its descriptors to the DP process 401 using the dp line function, as shown by the arrow 411. The DP process 401 maintains the IP/CCT handlers for the slot port. When a failure occurs that affects communication over the slot port, the DP process 401 tears down all routes associated with the slot port, distributes new routes to all line cards, and removes the working port process 404.

Figure 5:
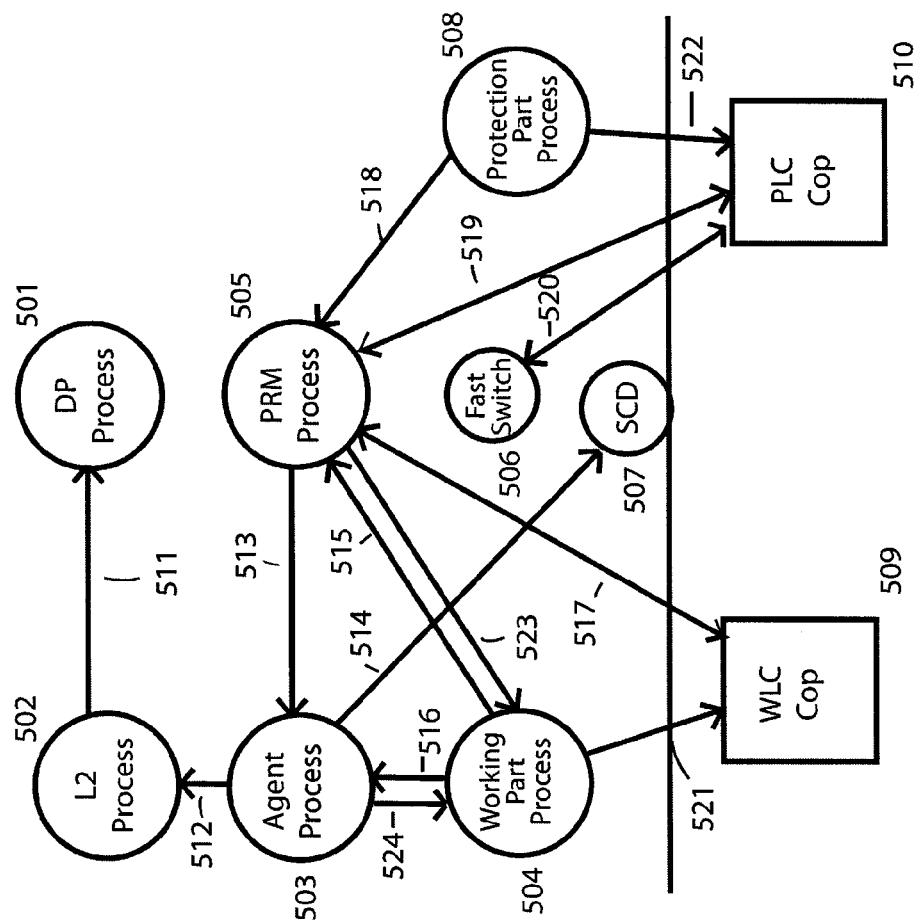
FIG. 5 is a schematic diagram showing the relevant processes associated with an exemplary embodiment of the present invention in which protection is used.

FIG. 5 shows the relevant processes associated with an exemplary embodiment of the present invention in which protection is used. The relevant processes include a DP process 501, a layer 2 (L2) process 502, an agent process 503, a working port process 504, a PRM process 505, a fast switch process 506, the SCD 507, a protection port process 508, a WLC core process (CoP) 509, and a PLC core process (CoP) 510.

During initialization, the DP process 501 creates the PRM process 505 and the fast switch process 506. The PRM process 505 is responsible for protection resource management. The fast switch process 506 is responsible for fast protection switching when the PLC Cop 510 detects a working line failure.

All protection ports register with the PRM process 505 using a predetermined "resource register" function. Thus, when the protection port process 508 is created, the protection port process 508 registers with the PRM process 505 using the resource register function, as shown by the arrow 518. The protection port process 508 activates the PLC CoP 510, as shown by the arrow 522. It should be noted that the protection port process 508 does not send its descriptors and data path line record to the L2 process 502, and no IP/CCT handlers are created in the SCD 507 for the protection port process 508.

Upon receiving the resource register from the protection port process 508, the PRM process 505 creates a protection group including the protection port if such a protection group does not already exist, or adds the protection port to a protection group if the protection group already exists.

All working ports that require protection also register with the PRM process 505 using a predetermined "protect request" function. Thus, when the working port process 504 is created, the working port process 504 registers with the PRM process 505 using the protect request function, as shown by the arrow 515. The working port process 504 activates the WLC CoP 509, as shown by the arrow 521.

Upon receiving the protect request from the working port process 504, the PRM process 505 creates a protection group including the working port if such a protection group does not already exist, or adds the working port to a protection group if the protection group already exists. The PRM process 505 also creates the agent process 503 for the working port, as shown by the arrow 513, and sends an agent identifier to the working port process 504, as shown by the arrow 523.

The agent process 503 is responsible for protection bridging and switching without tearing down routes. The agent process 503 owns all SCD 507 object handlers on behalf of the working port process 504, and interfaces with the L2 process 502 and the DP process 501 on behalf of the working port process 504.

Thus, instead of sending its descriptors and data path line record to the L2 process 502, the working port process 504 sends its descriptors and data path line record to the agent process 503 using the dp line function, as shown by the arrow 516. The agent process 503 sends appropriate replies to the working port process 504 upon receiving the descriptors and the data path line record, as shown by the arrow 524, and makes appropriate switch control interface function calls to create the IP/CCT handlers for the working port process 504 based upon the working port's descriptors, as shown by the arrow 514. The agent process 503 also modifies the working port's data path line record so that the agent process 503 is substituted for the working port process 504 in the data path, and sends the modified data path line record to the L2 process 502 using the dp line function, as shown by the arrow 512. In this way, the L2 process 502 is logically coupled to the agent process 503 rather than to the working port process 504. The L2 process 502 sends its descriptors and data path line record to the DP process 501 using the dp line function, as shown by the arrow 511.

The PRM process 505 sends configuration commands to the WLC CoP 509 and the PLC CoP 510, as shown by arrows 517 and 519. The configuration commands cause the WLC CoP 509 to begin sending "heartbeat" signals to the PLC CoP 510 and also cause the PLC CoP 510 to begin monitoring for the "heartbeat" signals.

Figure 6:
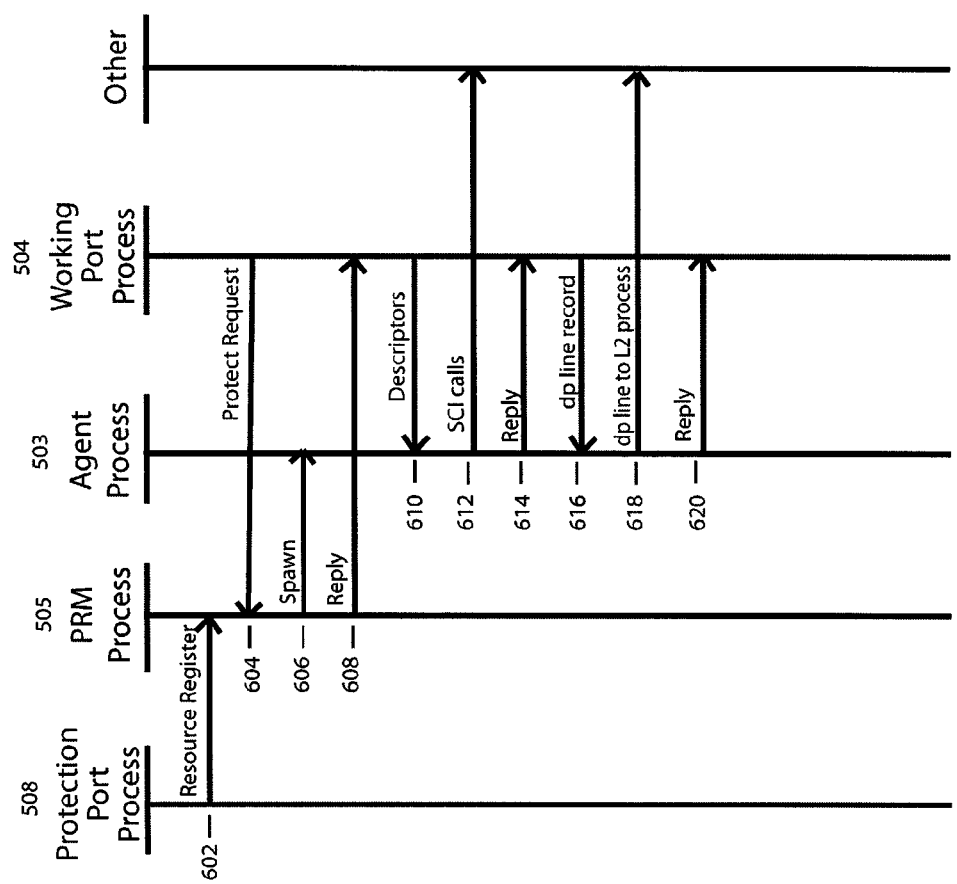
FIG. 6 is a message flow diagram showing exemplary message flows between various processes for setting up a protection group in accordance with an embodiment of the present invention.

FIG. 6 shows exemplary message flows between various processes for setting up a protection group. The protection port process 508 registers with the PRM process 505 using the resource register function, as shown by the arrow 602. The working port process 504 registers with the PRM process 505 using the protect request function, as shown by the arrow 604. Upon receiving the protect request from the working port process 504, the PRM process 505 creates (spawns) the agent process 503, as shown by the arrow 606, and sends a reply including the agent identifier to the working port process 504, as shown by the arrow 608. Upon receiving the reply 608 from the PRM process 505, the working port process 504 sends its descriptors to the agent process 503, as shown by the arrow 610. Upon receiving the descriptors from the working port process 504, the agent process 503 makes the appropriate SCI calls to create the IP/CCT handlers for the working port, as shown by the arrow 612, and sends a reply to the working port process 504, as shown by the arrow 614. The working port process 504 then sends its data path line record to the agent process 503, as shown by the arrow 616. Upon receiving the data path line record from the working port process 504, the agent process 503 sends a modified data path line record to the L2 process 502, as shown by the arrow 618, and sends a reply to the working port process 504, as shown by the arrow 620.

Once the PRM process 505 and the agent process 503 have been established as described above, it is possible for the networking device to perform protection switching using any of multiple redundancy and protection switching mechanisms without tearing down routes associated with the working line card. In a typical embodiment, the networking device supports various protection switching modes that generally require different protection switching operations depending on whether a protection port protects one working port or multiple working ports and whether the bridge is set up before detecting a failure of the working port or after detecting a failure of the working port. The various protection switching modes use bridging to bridge a working line card and a protection line card.

In one general category of protection switching modes, the bridge is established before a failure is detected that affects communication over the working port. In this case, the agent process 503 makes certain SCI function calls to clone the inbound and outbound paths of the working port and enable unicast and multicast bridging. The PRM process 505 sets up the bridge in the appropriate routing entries. When the PLC CoP 510 detects a failure affecting communication over the working port, the PLC CoP 510 performs any necessary switching at the line card level and sends a switch indication message to the PRM process 505, as indicated by the arrow 519. The PRM process 505 in turn makes an SCI function call to switch the IP/CCT handlers from the working port to the protection port.

Figure 7A:
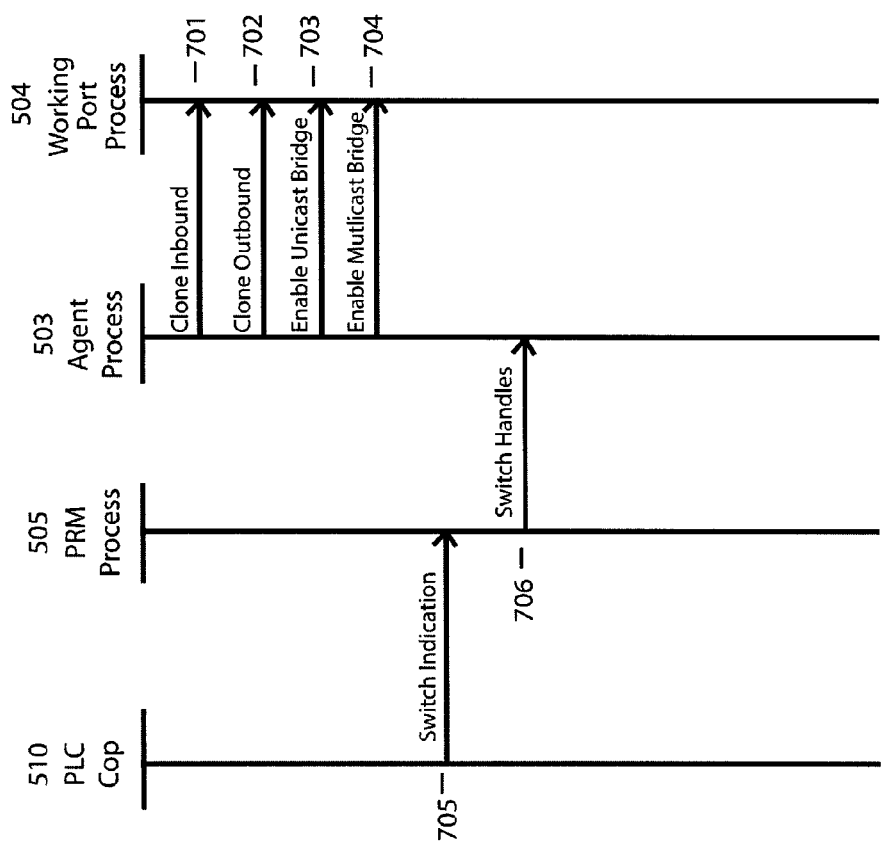
FIG. 7A is a message flow diagram showing exemplary message flows between various processes for establishing a bridge before a failure is detected that affects communication over the working port in accordance with an embodiment of the present invention.

FIG. 7A shows exemplary message flows between various processes for establishing a bridge before a failure is detected that affects communication over the working port. The agent process 503 makes certain SCI functions calls to clone the working port inbound path, as shown by the arrow 701, clone the working port outbound path, as shown by the arrow 702, enable unicast bridging, as shown by the arrow 703, and enable multicast bridging, as shown by the arrow 704. When the PLC CoP 510 detects a failure that affects communication over the working port, the PLC CoP 510 performs any necessary switching at the line card level and sends a switch indication message to the PRM process 505, as indicated by the arrow 705. The PRM process 505 in turn makes an SCI function call for the agent process 503 to switch the IP/CCT handlers from the working port to the protection port, as shown by the arrow 706.

In another general category of protection switching modes, the bridge is established after a failure is detected that affects communication over the working port. In this case, the PLC CoP 510 sends a switch request message to the fast switch 506 upon detecting the failure affecting communication over the working port, as shown by the arrow 520. The fast switch 506 makes certain SCI function calls to clone the inbound and outbound paths of the working port and enable unicast and multicast bridging, and sends a confirmation message to the PLC CoP 510, as shown by the arrow 520. The PLC CoP 510 performs any necessary switching at the line card level and sends a switch indication message to the PRM process 505, as indicated by the arrow 519. The PRM process 505 performs any switching necessary to complete the bridge.

Figure 7B:
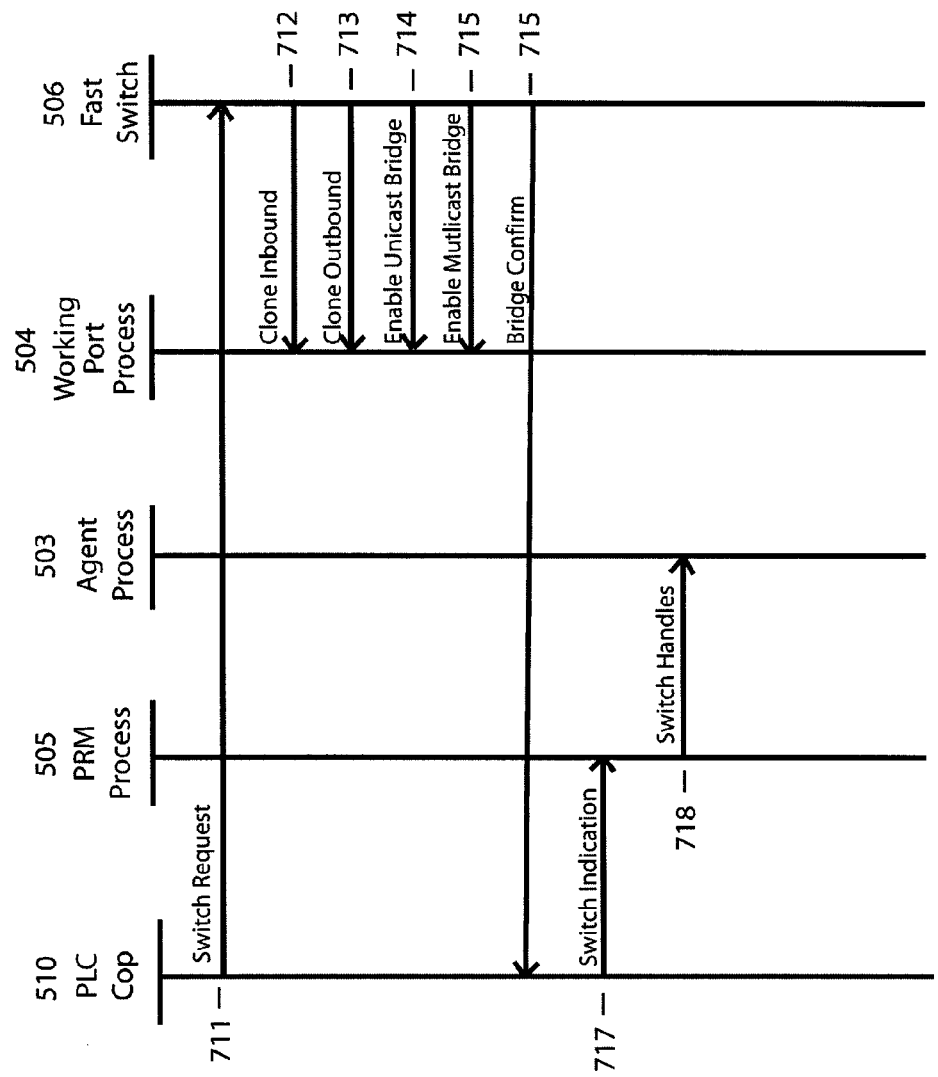
FIG. 7B is a message flow diagram showing exemplary message flows between various processes for establishing a bridge after a failure is detected that affects communication over the working port in accordance with an embodiment of the present invention.

FIG. 7B shows exemplary message flows between various processes for establishing a bridge after a failure is detected that affects communication over the working port. When the PLC Cop 510 detects a failure that affects communication over the working port, the PLC CoP 510 performs any necessary switching at the line card level and sends a switch request message to the fast switch 506, as indicated by the arrow 711. The fast switch 506 makes certain SCI functions calls to clone the working port inbound path, as shown by the arrow 712, clone the working port outbound path, as shown by the arrow 713, enable unicast bridging, as shown by the arrow 714, and enable multicast bridging, as shown by the arrow 715. The fast switch 506 sends a bridge confirm message to the PLC CoP 510, as shown by the arrow 716. The PLC CoP 510 sends a switch indication message to the PRM process 505, as shown by the arrow 717. The PRM process 505 in turn makes an SCI function call for the agent process 503 to switch the IP/CCT handlers from the working port to the protection port, as shown by the arrow 718.

Figure 8:
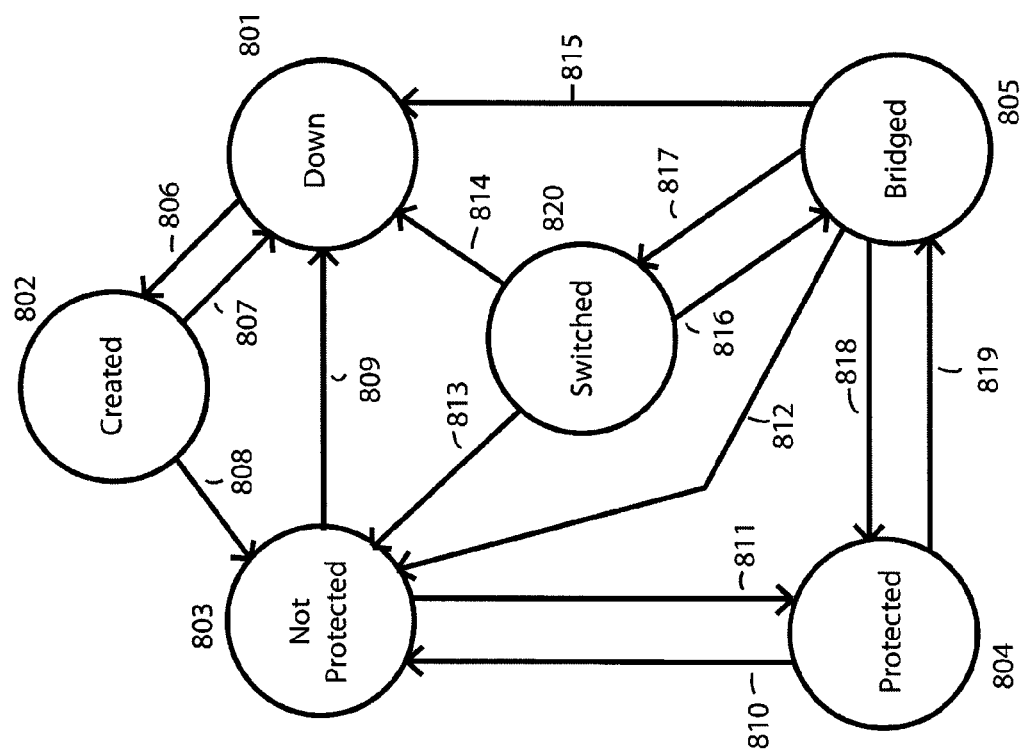
FIG. 8 is a state diagram showing some of the various states and state transitions of an agent process in accordance with an embodiment of the present invention.

FIG. 8 is a state diagram showing some of the various states and state transitions of the agent process 503. The agent process 503 can be generally defined with reference to six states, namely a DOWN state 801, a CREATED state 802, a NOT PROTECTED state 803, a PROTECTED state 804, a BRIDGED state 805, and a SWITCHED state 820. The DOWN state 801 represents the state in which the agent process 503 does not exist (either prior to its creation or after its termination/failure). The CREATED state 802 represents the state in which the agent process 503 is created but neither the working line nor the protection line are active. The NOT PROTECTED state 803 represents the state in which the working line is active but the protection line is inactive. The PROTECTED state 804 represents the state in which both the working line and the protection line are active. The BRIDGED state 805 represents the state in which the working line traffic is bridged to the protection line. The SWITCHED state 820 represents the state in which the IP/CCT handlers are switched from the working line to the protection line.

The DOWN state 801 is the default state for the agent process 503. When the agent process 503 is created, the agent process 503 transitions into the CREATED state 802, as shown by the arrow 806.

In the CREATED state 802, the agent process 503 is created but neither the working line nor the protection line are active. When the agent process 503 receives a protect request from the working line, the agent process 503 transitions into the NOT PROTECTED state 803, as shown by the arrow 808. If the agent process 503 is terminated or fails while in the CREATED state 802, then the agent process 503 transitions back to the DOWN state 801, as shown by the arrow 807.

In the NOT PROTECTED state 803, the working line is active but the protection line is inactive. When the agent process 503 receives a resource register from the protection line, the agent process 503 transitions into the PROTECTED state 804, as shown by the arrow 811. If the agent process 503 is terminated or fails while in the NOT PROTECTED state 803, then the agent process 503 transitions back to the DOWN state 801, as shown by the arrow 809.

It should be noted that the agent process 503 may receive the resource register from the protection line before receiving the protect request from the working line (i.e., while the agent process 503 is in the CREATED state 802). In this case, the agent process 503 remains in the CREATED state 802 until it receives the protect request from the working line, at which time the agent process 503 transitions transitorily into the NOT PROTECTED state 803 and then to the PROTECTED state 804, since both the working line and the protection line are active. This set of transitions is not shown for the sake of simplicity.

In the PROTECTED state 804, both the working line and the protection line are active. When a bridge is established between the working line and the protection line, the agent process 503 transitions into the BRIDGED state 805, as shown by the arrow 819. If the protection line fails while in the PROTECTED state 804, then the agent process 503 transitions back to the NOT PROTECTED state 803, as shown by the arrow 810. If the working line fails while in the PROTECTED state 804, then the agent process 503 transitions back to the CREATED state 802 (not shown for the sake of simplicity). If the agent process 503 is terminated or fails while in the PROTECTED state 804, then the agent process 503 transitions back to the DOWN state 801 (not shown for the sake of simplicity).

In the BRIDGED state 805, the working line traffic is bridged to the protection line. When the IP/CCT handlers are switched from the working line to the protection line, the agent process 503 transitions into the SWITCHED state 820, as shown by the arrow 817. If the bridge is deactivated while in the BRIDGED state 805, then the agent process 503 transitions back to the PROTECTED state 804, as shown by the arrow 818. If the protection line fails while in the BRIDGED state 805, then the agent process 503 transitions back to the NOT PROTECTED state 803, as shown by the arrow 812. If the agent process 503 is terminated or fails while in the BRIDGED state 805, then the agent process 503 transitions back to the DOWN state 801, as shown by the arrow 815.

In the SWITCHED state 820, IP/CCT handlers are switched from the working line to the protection line. If the IP/CCT handlers are switched back to the working line while in the SWITCHED state 820, then the agent process 503 transitions back to the BRIDGED state 805, as shown by the arrow 816. If the protection line fails while in the SWITCHED state 820, then the agent process 503 transitions back to the NOT PROTECTED state 803, as shown by the arrow 813. If the agent process 503 is terminated or fails while in the SWITCHED state 820, then the agent process 503 transitions back to the DOWN state 801, as shown by the arrow 814.

Figure 9:
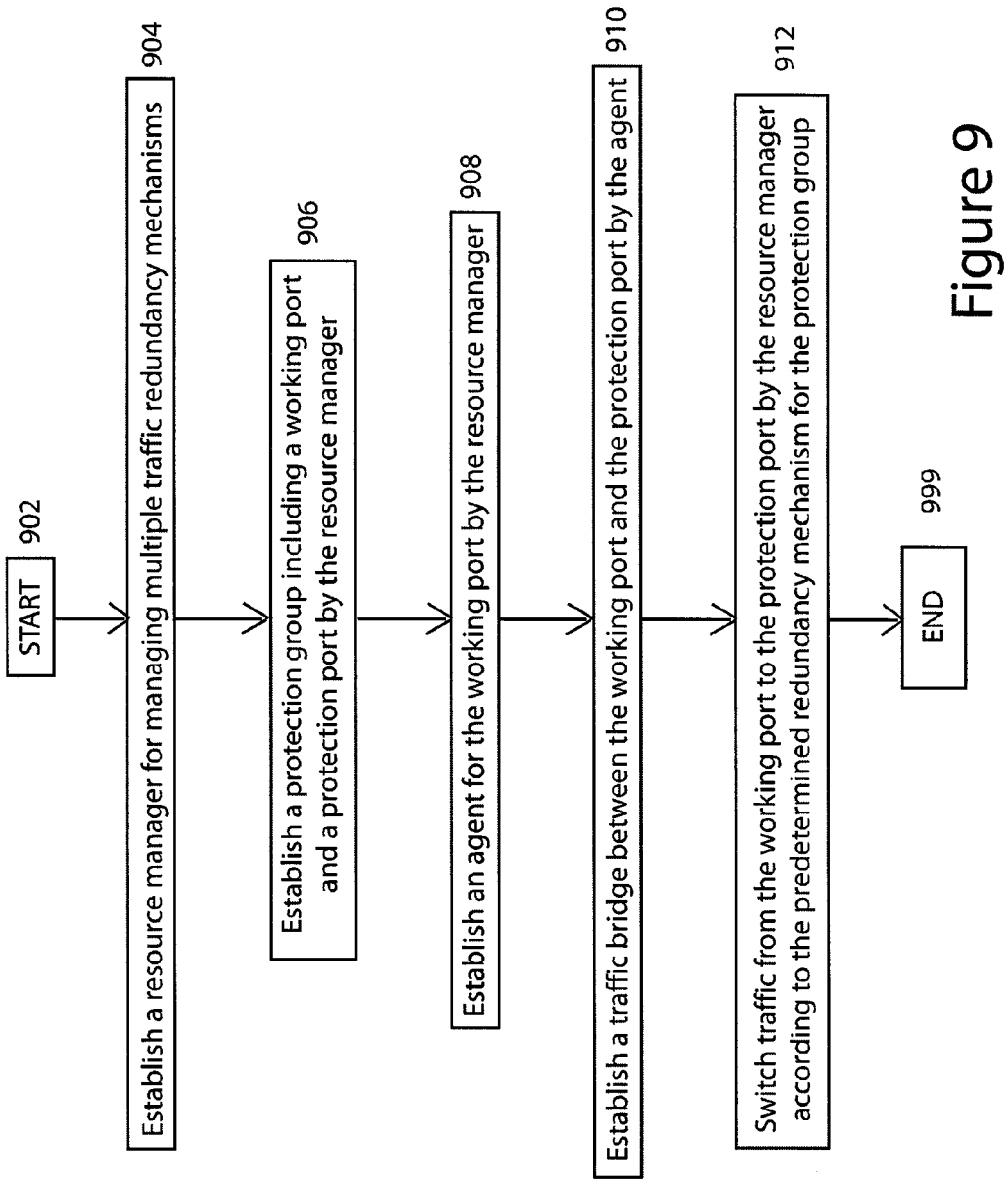
FIG. 9 is a logic flow diagram showing exemplary logic for managing multiple redundancy mechanisms in accordance with an embodiment of the present invention.

FIG. 9 shows exemplary networking device logic 900 for managing multiple redundancy mechanisms. Beginning in block 902, the logic establishes a resource manager for managing multiple redundancy mechanisms, in block 904. The resource manager establishes a protection group including a working port and a protection port, in block 906, and establishes an agent for the working port, in block 908. The agent establishes a traffic bridge between the working port and the protection port, in block 910. The resource manager switches traffic from the working port to the protection port according to a predetermined redundancy mechanism for the protection group, in block 912. The logic 900 terminates in block 999.

A typical networking device can support multiple port types and redundancy mechanisms, and the present invention is in no way limited to any particular port types or redundancy mechanisms. Exemplary port types include SONET (Synchronous Optical Network) and Gigabit Ethernet. Exemplary redundancy mechanisms include SONET automatic protection switching (for SONET ports) and Gigabit Ethernet automatic protection switching (for Gigabit Ethernet ports). It should be noted that the present invention is not limited to protection switching, as redundancy can be used to bridge traffic for other reasons, such as fault tolerance and mirroring.

It should be noted that the terms such as "switch" and "router" are used herein to describe various communication devices that may be used in a communication system, and should not be construed to limit the present invention to any particular communication device type. Thus, a communication device may include, without limitation, a bridge, router, bridge-router (brouter), switch, node, or other communication device.

It should also be noted that the term "traffic" is used herein to describe various communication messages that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow and message flow diagrams are used herein to demonstrate various aspects of the invention, and should not be construed to limit the present invention to any particular logic/message flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor within the networking device under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Thus, the present invention may be embodied as a method for supporting multiple traffic redundancy mechanisms in a networking device. The method involves establishing a resource manager for managing the multiple traffic redundancy mechanisms, establishing a protection group including a working port and a protection port by the resource manager, establishing an agent for the working port by the resource manager, maintaining handlers for the working port by the agent, establishing a traffic bridge between the working port and the protection port, and switching traffic from the working port to the protection port over the traffic bridge by the resource manager and the agent according to a predetermined redundancy mechanism for the protection group.

The resource manager typically includes a resource manager process for managing the multiple redundancy mechanisms. The resource manager typically creates the protection group upon receiving a protect request message from the working port or a resource register message from the protection port. The agent typically includes an agent process that is created by the resource manager, for example, upon receiving a protect request message from the working port. The agent process typically remains active even if the working port fails so that routes associated with the working port remain active. The agent typically receives descriptors from the working port and creates the handlers for the working port. The agent typically maintains the handlers in a switch control driver.

Establishing a traffic bridge between the working port and the protection port typically involves cloning an inbound path of the working port, cloning an outbound path of the working port, enabling unicast bridging between the working port and the protection port, and enabling multicast bridging between the working port and the protection port. The traffic bridge may be established by the agent before a failure is detected that affects communication over the working port, or the traffic bridge may be established by a fast switch upon receiving a switch request from the protection port after the protection port detects a failure that affects communication over the working port. In any case, switching traffic from the working port to the protection port typically involves receiving a switch indication by the resource manager from the protection port and signaling the agent to switch the handlers from the working port to the protection port.

In one exemplary embodiment of the invention, the working port and the protection port are SONET ports, and the predetermined redundancy mechanism is a SONET automatic protection switching mechanism. In another exemplary embodiment of the invention, the the working port and the protection port are Gigabit Ethernet ports, and the predetermined redundancy mechanism is a Gigabit Ethernet automatic protection switching mechanism.

The present invention may also be embodied as an apparatus for managing multiple redundancy mechanisms. A typical apparatus includes a working port, a protection port, a resource manager for supporting the multiple redundancy mechanisms, and an agent for the working port. The resource manager is operably coupled to create a protection group for the working port and the protection port. The agent is operably coupled to maintain handlers for the working port. The resource manager and the agent are operably coupled to switch traffic from the working port to the protection port over a traffic bridge between the working port and the protection port according to a predetermined redundancy mechanism.

The resource manager typically includes a resource manager process for managing the multiple redundancy mechanisms. The resource manager is operably coupled to create the protection group upon receiving a protect request message from the working port or a resource register message from the protection port. Thus, the working port is operably coupled to send a protect request message to the resource manager in order to request protection from the protection port, the protection port is operably coupled to send a resource register message to the resource manager in order to register with the resource manager, and the resource manager is operably coupled to establish the protection group upon receiving one of the protect request message and the resource register message.

The agent typically includes an agent process that is created by the resource manager, for example, upon receiving a protect request message from the working port. The agent process is operably coupled to remain active even if the working port fails so that routes associated with the working port remain active. The agent is operably coupled to receive descriptors from the working port, create the handlers for the working port, and maintain the handlers in a switch control driver.

The traffic bridge may be established by the agent, in which case the agent is operably coupled to clone an inbound path of the working port, clone an outbound path of the working port, enable unicast bridging between the working port and the protection port, and enable multicast bridging between the working port and the protection port.

Alternatively, the traffic bridge may be established by a fast switch following a failure that affects communication over the working port, in which case the protection port is operably coupled to detect a failure affecting communication over the working port and send a switch request to the fast switch and the fast switch is operably coupled to establish the traffic bridge between the working port and the protection port upon receiving the switch request from the protection port.

In order to switch traffic from the working port to the protection port, the protection port is operably coupled to detect a failure affecting communication over the working port and send a switch indication to the resource manager, the resource manager is operably coupled to signal the agent to switch the handlers from the working port to the protection port upon receiving the switch indication from the protection port, and the agent upon receiving the signal from the resource manager.

In one exemplary embodiment of the invention, the working port and the protection port are SONET ports, and the predetermined redundancy mechanism is a SONET automatic protection switching mechanism. In another exemplary embodiment of the invention, the the working port and the protection port are Gigabit Ethernet ports, and the predetermined redundancy mechanism is a Gigabit Ethernet automatic protection switching mechanism.

The present invention may also be embodied as a computer program for controlling a computer system. The computer program includes a resource manager for supporting the multiple redundancy mechanisms and an agent for the working port. The resource manager is programmed to create a protection group for a working port and a protection port. The agent is programmed to maintain handlers for the working port. The resource manager and the agent are programmed to switch traffic from the working port to the protection port over a traffic bridge between the working port and the protection port according to a predetermined redundancy mechanism.

The resource manager typically includes a resource manager process for managing the multiple redundancy mechanisms. The resource manager is programmed to create the protection group upon receiving a protect request message from the working port or a resource register message from the protection port. Thus, the resource manager is programmed to receive a protect request message from the working port, receive a resource register message from the protection port, and establish the protection group upon receiving one of the protect request message and the resource register message.

The agent typically includes an agent process that is created by the resource manager, for example, upon receiving a protect request message from the working port. The agent process is programmed to remain active even if the working port fails so that routes associated with the working port remain active. The agent is programmed to receive descriptors from the working port, create the handlers for the working port, and maintain the handlers in a switch control driver.

The traffic bridge may be established by the agent, in which case the agent is programmed to clone an inbound path of the working port, clone an outbound path of the working port, enable unicast bridging between the working port and the protection port, and enable multicast bridging between the working port and the protection port.

Alternatively, the traffic bridge may be established by a fast switch following a failure that affects communication over the working port, in which case the protection port is programmed to detect a failure affecting communication over the working port and send a switch request to the fast switch. The fast switch is programmed to establish the traffic bridge between the working port and the protection port upon receiving the switch request from the protection port.

In order to switch traffic from the working port to the protection port, the resource manager is programmed to receive a switch indication from the protection port and signal the agent to switch the handlers from the working port to the protection port upon receiving the switch indication from the protection port. The agent is programmed to switch the handlers from the working port to the protection port upon receiving the signal from the resource manager.

In one exemplary embodiment of the invention, the working port and the protection port are SONET ports, and the predetermined redundancy mechanism is a SONET automatic protection switching mechanism. In another exemplary embodiment of the invention, the the working port and the protection port are Gigabit Ethernet ports, and the predetermined redundancy mechanism is a Gigabit Ethernet automatic protection switching mechanism.

The computer program may be embodied in a computer readable medium or as a data signal embodied in a carrier wave.

The present invention may be embodied in other specific forms without departing from the true scope of the invention. The described embodiments are to be considered in all respects only as illustrative and not restrictive.

I claim:

1. A method for facilitating establishment of a bridge between a working port and a protection port for supporting multiple traffic redundancy mechanisms in a networking device to preserve a communication path in a network, the method comprising:

establishing a resource manager for managing the multiple traffic redundancy mechanisms;

establishing a protection group including a working port and a protection port by the resource manager;

establishing an agent for the working port by the resource manager;

maintaining handlers for the working port by the agent;

detecting a failure that affects traffic on a path associated with the working port; and cloning the path by:

maintaining routes associated with the working port in memory;

employing the routes to establish a traffic bridge between the working port and the protection port; and switching traffic from the working port to the protection port over the traffic bridge by the resource manager and the agent according to a predetermined redundancy mechanism for the protection group such that the communication path is unaltered in a forwarding table of an upstream line card and remains usable from the perspective of that upstream line card.

2. The method of claim 1, wherein the resource manager comprises a resource manager process for managing the multiple redundancy mechanisms.

3. The method of claim 1, wherein establishing the protection group by the resource manager comprises:
receiving a protect request message by the resource manager from the working port; and
receiving a resource register message by the resource manager from the working port.

4. The method of claim 1, wherein establishing the agent for the working port by the resource manager comprises:
creating an agent process for the working port.

5. The method of claim 4, wherein the agent process remains active even if the working port fails.

6. The method of claim 1, wherein maintaining handlers for the working port by the agent comprises:
receiving descriptors by the agent from the working port; and creating the handlers based upon the descriptors.

7. The method of claim 6, further comprising:
maintaining the handlers by the agent in a switch control driver.

8. The method of claim 1, wherein establishing a traffic bridge between the working port and the protection port comprises:
cloning an inbound path of the working port;
cloning an outbound path of the working port; enabling unicast bridging between the working port and the protection port; and
enabling multicast bridging between the working port and the protection port.

9. The method of claim 1, wherein switching traffic from the working port to the protection port over the traffic bridge by the resource manager and the agent according to a predetermined redundancy mechanism for the protection group comprises:
receiving a switch indication from the protection port; and
signaling the agent to switch the handlers from the working port to the protection port.

10. The method of claim 9, further comprising:
receiving the signal from the resource manager to switch the handlers from the working port to the protection port; and
switching the handlers from the working port to the protection port by the agent.

11. The method of claim 1, wherein establishing a traffic bridge between the working port and the protection port comprises:
establishing the traffic bridge between the working port and the protection port by the agent.

12. The method of claim 1, wherein establishing a traffic bridge between the working port and the protection port comprises:
establishing a switch;
receiving a switch request by the switch from the protection port; and
establishing the traffic bridge between the working port and the protection port by the switch.

13. The method of claim 1, wherein the working port and the protection port are SONET ports, and wherein the predetermined redundancy mechanism comprises a SONET automatic protection switching mechanism.

14. The method of claim 1, wherein the working port and the protection port are Gigabit Ethernet ports, and wherein the predetermined redundancy mechanism comprises a Gigabit Ethernet automatic protection switching mechanism.

15. An apparatus for facilitating establishment of a bridge for managing multiple redundancy mechanisms to preserve a communication path in a network, the apparatus comprising:
a working port;
a protection port;
a resource manager for supporting the multiple redundancy mechanisms; and
an agent for the working port, wherein:
the resource manager is operably coupled to create a protection group for the working port and the protection port;
the agent is operably coupled to maintain handlers for the working port subsequent to detection of a failure that affects traffic on a path associated with the working port; and
the resource manager and the agent are operably coupled to employ the handlers to clone the path by establishing a bridge between the working port and the protection port in response to detection of a failure that affects traffic on the path associated with the working port in order to switch traffic from the working port to the protection port according to a predetermined redundancy mechanism
such that the communication path is unaltered in a forwarding table of an upstream line card and remains usable from the perspective of that upstream line card.

16. The apparatus of claim 15, wherein the resource manager comprises a resource manager process for managing the multiple redundancy mechanisms.

17. The apparatus of claim 15, wherein:
the working port is operably coupled to send a protect request message to the resource manager in order to request protection from the protection port;
the protection port is operably coupled to send a resource register message to the resource manager in order to register with the resource manager; and
the resource manager is operably coupled to establish the protection group upon receiving one of the protect request message and the resource register message.

18. The apparatus of claim 17, wherein the agent comprises an agent process, and wherein the resource manager is operably coupled to create the agent process upon receiving the protect request message from the working port.

19. The apparatus of claim 18, wherein the agent process is operably coupled to remain active even if the working port fails.

20. The apparatus of claim 15, wherein the agent is operably coupled to receive descriptors from the working port and create the handlers based upon the descriptors.

21. The apparatus of claim 20, wherein the agent is operably coupled to maintain the handlers in a switch control driver.

22. The apparatus of claim 15, wherein:
the protection port is operably coupled to detect a failure affecting communication over the working port and send a switch indication to the resource manager;
the resource manager is operably coupled to signal the agent to switch the handlers from the working port to the protection port upon receiving the switch indication from the protection port; and the agent is operably coupled to switch the handlers from the working port to the protection port upon receiving the signal from the resource manager.

23. The apparatus of claim 15, wherein the agent is operably coupled to establish the traffic bridge between the working port and the protection port by the agent.

24. The apparatus of claim 23, wherein:

the agent is operably coupled to clone an inbound path of the working port;

the agent is operably coupled to clone an outbound path of the working port;

the agent is operably coupled to enable unicast bridging between the working port and the protection port; and the agent is operably coupled to enable multicast bridging between the working port and the protection port.

25. The apparatus of claim 15, further comprising a switch for establishing the traffic bridge following a failure that affects communication over the working port.

26. The apparatus of claim 25, wherein:

the protection port is operably coupled to detect a failure affecting communication over the working port and send a switch request to the switch; and the switch is operably coupled to establish the traffic bridge between the working port and the protection port upon receiving the switch request from the protection port.

27. The apparatus of claim 26, wherein:

the switch is operably coupled to clone an inbound path of the working port;

the switch is operably coupled to clone an outbound path of the working port;

the switch is operably coupled to enable unicast bridging between the working port and the protection port; and the switch is operably coupled to enable multicast bridging between the working port and the protection port.

28. The apparatus of claim 15, wherein the working port and the protection port are SONET ports, and wherein the predetermined redundancy mechanism comprises a SONET automatic protection switching mechanism.

29. The apparatus of claim 15, wherein the working port and the protection port are Gigabit Ethernet ports, and wherein the predetermined redundancy mechanism comprises a Gigabit Ethernet automatic protection switching mechanism.

30. A computer-readable storage medium encoded with a computer program for facilitating establishment of a bridge for controlling a computer system to preserve a communication path in a network, the computer program comprising:

a resource manager for supporting the multiple redundancy mechanisms; and an agent for the working port, wherein:

the resource manager is programmed to create a protection group for a working port and a protection port;

the agent is programmed to maintain handlers for the working port subsequent to detection of a failure that affects traffic on a path associated with the working port; and the resource manager and the agent are programmed to employ the handlers to clone the path by establishing a bridge between the working port and the protection port in response to detection of a failure that affects traffic on the path associated with the working port in order to switch traffic from the working port to the protection port according to a predetermined redundancy mechanism such that the communication path is unaltered in a forwarding table of an upstream line card and remains usable from the perspective of that upstream line card.

31. The computer-readable storage medium of claim 30, wherein the resource manager comprises a resource manager process for managing the multiple redundancy mechanisms.

32. The computer-readable storage medium of claim 30, wherein:

the resource manager is programmed to receive a protect request message from the working port in order to request protection from the protection port;

the resource manager is programmed to receive a resource register message from the protection port in order to register with the resource manager; and the resource manager is programmed to establish the protection group upon receiving one of the protect request message and the resource register message.

33. The computer-readable storage medium of claim 32, wherein the agent comprises an agent process, and wherein the resource manager is programmed to create the agent process upon receiving the protect request message from the working port.

34. The computer-readable storage medium of claim 33, wherein the agent process is programmed to remain active even if the working port fails.

35. The computer-readable storage medium of claim 30, wherein the agent is programmed to receive descriptors from the working port and create the handlers based upon the descriptors.

36. The computer-readable storage medium of claim 35, wherein the agent is programmed to maintain the handlers in a switch control driver.

37. The computer-readable storage medium of claim 30, wherein:

the resource manager is programmed to signal the agent to switch the handlers from the working port to the protection port upon receiving a switch indication from the protection port; and the agent is programmed to switch the handlers from the working port to the protection port upon receiving the signal from the resource manager.

38. The computer-readable storage medium of claim 30, wherein the agent is programmed to establish the traffic bridge between the working port and the protection port by the agent.

39. The computer-readable storage medium of claim 38, wherein:

the agent is programmed to clone an inbound path of the working port;

the agent is programmed to clone an outbound path of the working port;

the agent is programmed to enable unicast bridging between the working port and the protection port; and the agent is programmed to enable multicast bridging between the working port and the protection port.

40. The computer-readable storage medium of claim 30, further comprising a switch for establishing the traffic bridge following a failure that affects communication over the working port.

41. The computer-readable storage medium of claim 40, wherein:

the switch is programmed to establish the traffic bridge between the working port and the protection port upon receiving a switch request from the protection port.

42. The computer-readable storage medium of claim 41, wherein:

the switch is programmed to clone an inbound path of the working port;

the switch is programmed to clone an outbound path of the working port;

the switch is programmed to enable unicast bridging between the working port and the protection port; and the switch is programmed to enable multicast bridging between the working port and the protection port.

43. The computer-readable storage medium of claim 30, wherein the working port and the protection port are SONET ports, and wherein the predetermined redundancy mechanism comprises a SONET automatic protection switching mechanism.

44. The computer-readable storage medium of claim 30, wherein the working port and the protection port are Gigabit Ethernet ports, and wherein the predetermined redundancy mechanism comprises a Gigabit Ethernet automatic protection switching mechanism.

* * * * *